United States Patent [19]

Hettiarachchi et al.

[11] Patent Number: 5,366,602
[45] Date of Patent: Nov. 22, 1994

[54] METHOD OF PROTECTING EMBEDDED REINFORCING MEMBERS

[75] Inventors: Samson Hettiarachchi, Menlo Park; Ann T. Gaynor, Union City, both of Calif.

[73] Assignee: SRI International, Menlo Park, Calif.

[21] Appl. No.: 448,940

[22] Filed: Dec. 11, 1989

[51] Int. Cl.$^5$ .............................................. C25D 13/00
[52] U.S. Cl. ................. 204/180.1; 204/180.2; 204/180.7; 204/147
[58] Field of Search ............ 204/180, 130, 147, 180.2, 204/180.7

[56] References Cited

U.S. PATENT DOCUMENTS

| | | | |
|---|---|---|---|
| 3,484,349 | 12/1969 | Vrable | 204/180.2 |
| 4,092,109 | 5/1978 | Rosenberg | 106/98 |
| 4,321,304 | 3/1982 | Castellucci | 428/418 |
| 4,365,999 | 12/1982 | Fujita et al. | 106/90 |
| 4,443,312 | 4/1984 | Hennon | 204/180.2 |
| 4,664,764 | 5/1987 | Zofan | 204/147 |
| 4,865,702 | 9/1989 | Miller et al. | 204/147 |
| 4,900,410 | 2/1990 | Bennett | 204/147 |

OTHER PUBLICATIONS

Wranglen, "An Introduction to Corrosion and Protection of Metals", p. 263.
Fontana, "Corrosion Engineering", p. 369.

*Primary Examiner*—John Niebling
*Assistant Examiner*—Arun S. Phasge
*Attorney, Agent, or Firm*—Peter J. Dehlinger

[57] ABSTRACT

A method for applying an anti-corrosive agent to a reinforcing bar in a cementitious structure. An electrolyte solution containing the anti-corrosive agent is placed in contact with a surface of the structure, and the agent is drawn into and through the structure, into contact with the embedded reinforcing bar, by an electric field.

18 Claims, 4 Drawing Sheets

METHOD OF PROTECTING EMBEDDED REINFORCING MEMBERS

Portions of this work were supported by a grant from the U.S. Department of Transportation, Grant No. SHRP-87-C102C. The U.S. Government has certain rights in this application.

FIELD OF THE INVENTION

The present invention relates to a method for applying an anti-corrosion agent to corrodible reinforcing members embedded in microporous matrices in structures, such as concrete and mortar structures.

BACKGROUND OF THE INVENTION

Structural materials such as concrete and mortar have high resistance to compression forces, but low resistance to bending and shear forces. To compensate for these weaknesses, structures made from these materials also include reinforcing bars to reinforce the structure against bending and shear forces which may cause the structure to fail. This is especially true of concrete and mortar structures which are used in highway and building construction. The reinforcing member is usually an iron or steel rod or bar which is imbedded in the structure typically by pouring the wet concrete or mortar into a mold containing the bar, typically as part of a network of reinforcing bars.

Over time, the reinforcing bars tend to lose their tensile strength due to oxidation. Oxidation may be hastened by contact with salts, such as may occur in coastal areas, or where salt is applied to road surfaces to remove ice. Eventually, the reinforcing bars may be corroded to the point where they can no longer provide effective stress protection. Structural failures due to such corrosion, such as in some highway bridges, is not uncommon.

Attempts to counteract the corrosion of structural reinforcing members in cement structures without completely rebuilding the structure have been proposed. In one approach, the corroded reinforcing bars in a structure are treated by applying an electric current to the bars. The reinforcing bars serve as a cathode, and a dimensionally-stable electrode or a conductive polymer electrode on the structure surrounding the member serves as an anode. The application of an electric current reverses the electrochemical oxidation of the reinforcing members in the structure. However, the method does not provide long-term protection.

U.S. Pat. No. 4,092,109 discloses a method for inhibiting corrosion in reinforcing members by including applying calcium nitrite in mortar and concrete mixtures used in reinforced structures. This method is not applicable, of course, to preexisting structures. The patent also discloses a method for inhibiting corrosion in a reinforced cement structures, by soaking the structure with a 25% solution of calcium nitrite in water. This method is limited by the slow the rate of migration of $NO_2^-$ ions into the cement matrix.

SUMMARY OF THE INVENTION

It is one general object of the present invention to provide an efficient method for treating a pre-existing reinforced structure to reduce corrosion of reinforcing metal bars or members in the structure.

The invention includes a method of applying an anti-corrosive agent to a corrodible reinforcing member embedded within a microporous matrix in a structure. In practicing the method, an electrolyte solution containing the anti-corrosive agent is placed in contact with a surface of the structure, and a first electrode is placed in contact with the electrolyte solution. A second electrode, which may include the reinforcing member, is placed at a position spaced from the first electrode, such that application of a voltage across the electrodes is effective to produce an electric field in a region of the structure which includes the reinforcing member.

A selected-polarity voltage effective to cause ion-mediated migration of the anti-corrosive agent in the electrolyte solution through this structure region is applied across the two electrodes. The anti-corrosive agent is thus brought into contact with the reinforcing member to protect it from corrosion.

In one preferred embodiment, the voltage-induced migration of the anti-corrosive agent is continued until the reinforcing member has a corrosion potential greater than about $-0.35$ V, as measured by the difference in voltage between the reinforcing member and a silver chloride half-cell.

These and other objects and features of the invention will become more fully apparent when the following detailed description of the invention is read in conjunction with the accompanying drawings.

DETAILED DESCRIPTION OF THE INVENTION

Figure 1:
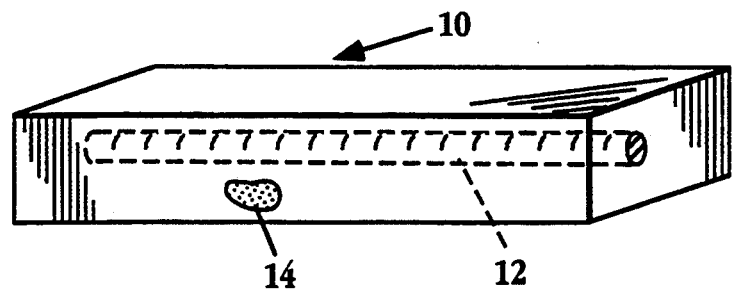
FIG. 1 shows a three-dimensional view of a structure having a reinforcing bar embedded in a cementitious microporous matrix.

The method of the present invention is designed for protecting a reinforcing member which is embedded in a microporous matrix. The reinforcing member, or bar, and microporous matrix together form a reinforced structure, such as the cement structure illustrated at 10 in FIG. 1. The reinforcing bar is shown here at 12, and the microporous matrix, at 14. The reinforcing member may be iron, steel, or any corrodible metal material used for reinforcing structures. The matrix is formed of any cementitious material, such as concrete (a mixture of sand, gravel, lime, clay and water) or mortar (a mixture of sand, lime and water) which has microporous structures.

To bring the anti-corrosive agent into contact with the reinforcing member, the present invention utilizes the force of an externally applied electric field acting on ions present in a solution of the anti-corrosive agent, to draw the agent into and through the microporous matrix.

An electric field will cause the ions to move according to the physical relation $F_{ion}=qE_{applied}$, where $F_{ion}$ represents a force vector acting on an ion of charge q due to an applied electric field $E_{applied}$. By contacting the anti-corrosion agent to the surface of the structure, and placing the agent and the region of matrix including the agent and the reinforcing member in an appropriately-oriented electric field, the agent can be forced to migrate into the matrix and thereby contact and protect the reinforcing member.

The anti-corrosive agent may be any ionic or non-ionic chemical compound known to retard the corrosion of metals. Examples of cationic anti-corrosive agents are: tetra-alkyl phosphonium salts, having cations such as $(C_2H_5)_4P^+$ (TEP+) or $(C_4H_9)_4P^+$ (available from Aldrich Chemical Co. ), or the phosphonium salts described in U.S. Pat. No. 3,664,807 to Redmore et al. Anionic corrosion inhibitors, such as molybdate ($MoO_4^{-2}$) ions and nitrite ($NO_2^-$) ions, and neutral anti-corrosive agents, such as amines and alcohols, may also be used. If neutral anti-corrosive agents are used, a charged surfactant, e.g., a detergent or a quaternary ammonium salt such as octadecyltributylammonium bromide, or other charged solute species, should also be included in the electrolyte solution to act as a carrying medium.

A. Migration of Anti-Corrosive Agents Into a Matrix

Figure 2:
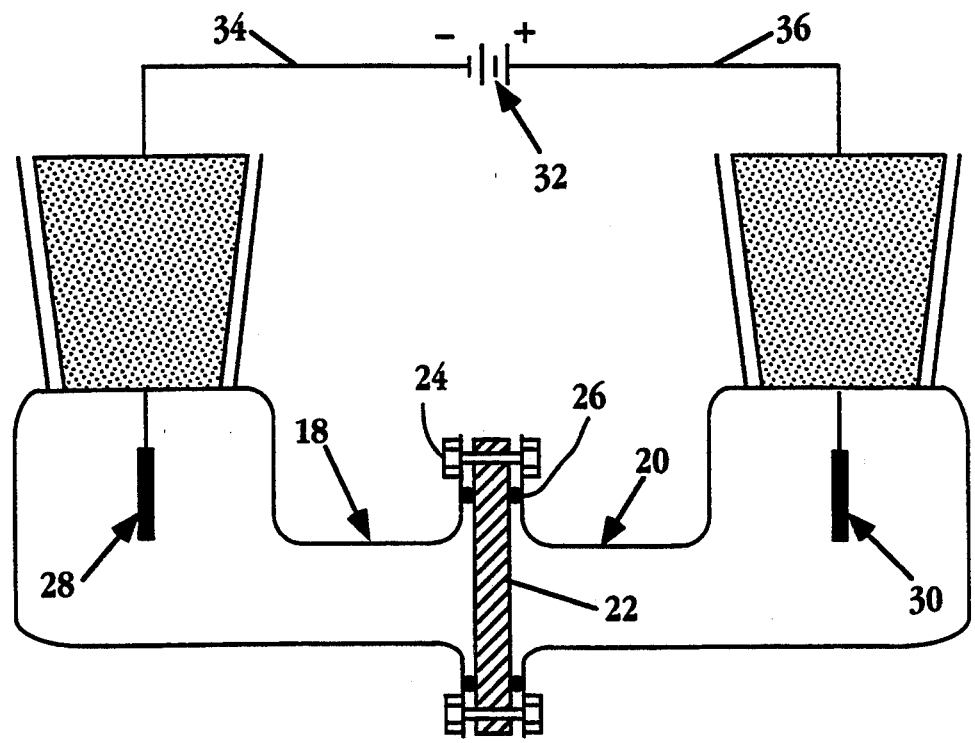
FIG. 2 shows an apparatus for demonstrating the ability of the anti-corrosive agent to migrate through a microporous matrix under an applied electric field.

FIG. 2 shows an apparatus 16 designed to measure the ability of an anti-corrosive agent to migrate through a microporous matrix under the influence of an electric field. Glass electrolyte cells 18, 20 in the apparatus figure are attached to opposite faces of concrete disk 22 as shown. Briefly, the cells are attached to the disk at their flared ends by bolts, such as bolt 24, with an O-ring, such as O-ring 26 compressed between each disk side and the confronting cell end, to seal the apparatus. The disc employed in the apparatus has a 2 cm radius and 2 cm thickness, and had been cured for 28 days before use to ensure complete hardening.

In one experiment, cell 18 was filled with a 0.285M $Na_2SO_4$ electrolyte solution containing a 100 mM concentration of $NaNO_2$, and cell 20, with a saturated $Na_2SO_4$ solution (no $NaNO_2$ was present initially). Graphite or Pt electrodes 28, 30 were immersed in the electrode solutions, and were connected to a DC power supply 32 by conducting wires 34, 36, respectively, such that electrodes 28, 30, functioned as cathode and anode, respectively. When voltage was applied across the electrodes, $NO_2^-$ ions present in the cathodic cell were drawn through the microporous concrete matrix toward the anode under the influence of the electric field established in the disc. Table 1 shows the change in $NO_2^-$ concentrations, in mM, in the cathodic and anodic solutions over a time period of 94 hours, at a constant voltage of 20 V.

TABLE 1

| Electrical Injection of Nitrite Ions Through Cement Disks | | |
|---|---|---|
| Time (hr) | [$NO_2^-$] (Cathodic) | [$NO_2^-$] (Anodic) |
| 0.0 | 100.0 | 0.0 |
| 20.0 | 12.1 | 0.0 |
| 94.0 | 0.0 | 3.0 |

As seen in Table 1, almost 90% of the nitrite ions have moved out of cathodic solution after 20 hours of applied voltage. After 94 hours, 3% of the ions have migrated through the disk and into the anodic solution and no measurable amount of nitrite was present in cathodic solution. Presumably the remaining nitrite ions were in the microstructure of the concrete disk. The slowed migration of the $NO_2^-$ ions through the disk can be explained by the greater numbers of collisions between the nitrite ions and the atoms of the concrete matrix, as the ions are drawn through the disc. This explanation is consistent with observations that the rate of migration of ions is inversely proportional to the size of the aggregate used in the concrete mixture and the amount of curing of the concrete disk.

The above-described studies were repeated using solutions of $Na_2MoO_4$, $(C_2H_5)_4PNO_2$ ($TEPNO_2$) where the migrating species are $MoO_4^{-2}$ and TEP+. The polarity of the power supply was reversed for the TEP+ study, so that TEP+ contained in cell 18 in FIG. 2 was anodic, and cell 20, cathodic. The results of those experiments are similar to those observed in the Table 1 study discussed above. The cell concentrations shown in the tables are in mM.

TABLE 2

| Migration of Molybdate Ions Through Cement Disks | | |
|---|---|---|
| Time (hr) | [$MoO_4^{-2}$] (cathodic) | [$MoO_4^-$] (anodic) |
| 0.0 | 100.0 | 0.0 |
| 20.0 | 72.6 | 6.8 |
| 94.0 | 64.1 | 10.7 |

TABLE 3

| Migration of TEP+ Ions Through Cement Disks | | |
|---|---|---|
| Time (hr) | [TEP+] (anodic) ) | [TEP+] (cathodic) |
| 0.0 | 100.0 | 0.0 |
| 20.0 | 49.3 | 10.6 |
| 94.0 | 14.3 | 67.7 |

Figure 3:
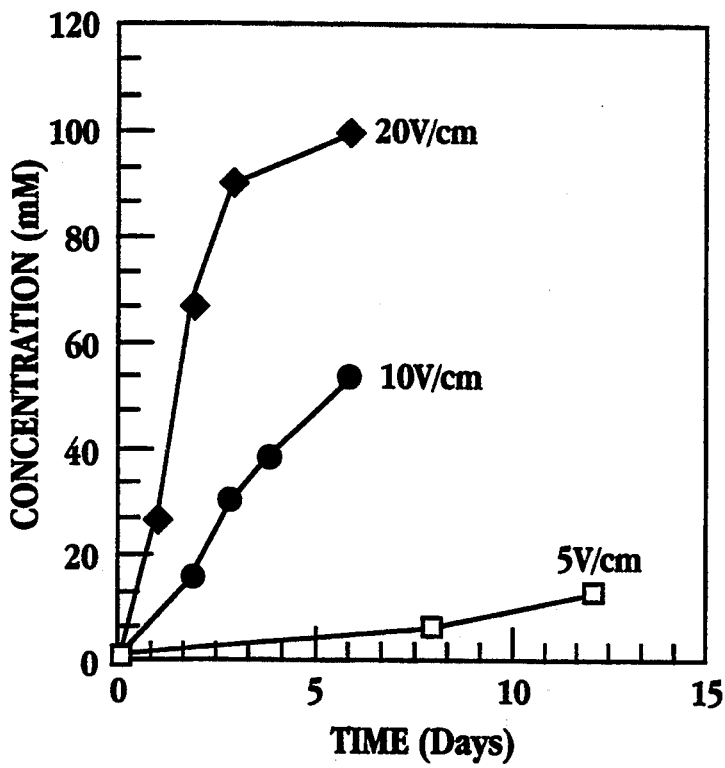
FIG. 3 shows the effect of electric field magnitude on the rate of migration of anti-corrosive agents through a mortar disk.
Figure 4:
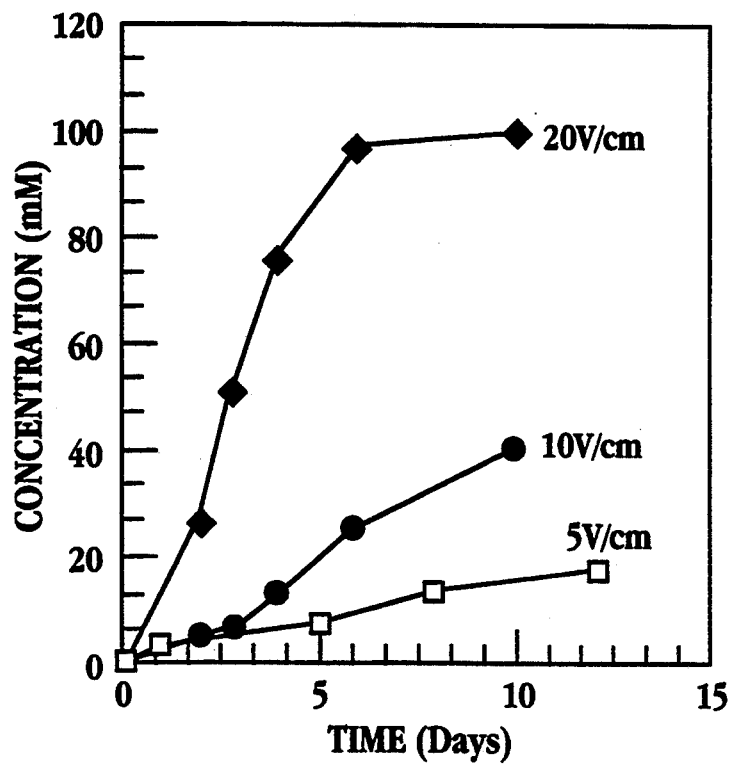
FIG. 4 shows the effect of electric field magnitude on the rate of migration of anti-corrosive agents through a concrete disk.

The effect of varying field strength on the rate of ion migration was also examined. The results for both mortar and concrete disks using a saturated $Ca(OH)_2$ solution containing 100 mM $TEPNO_2$, with applied potentials of 5, 10, and 20 volts/cm, are shown in FIGS. 3 and 4 respectively. FIG. 3, which plots the accumulation of TEP+ ions in the cathodic side of a mortar disc, demonstrates that larger electric field magnitudes above 5 V/cm dramatically increase the rate of ion migration through the microporous disks. The results suggest that voltages in the range 10 V/cm or above, and more generally between about 5-20 V/cm, provide relatively high ion migration rates. Similar results were obtained for the migration of TEP+ ions through a concrete disc as seen in FIG. 4.

B. Applying an Anti-Corrosive Agent to Imbedded Reinforcing Members

Figure 5:
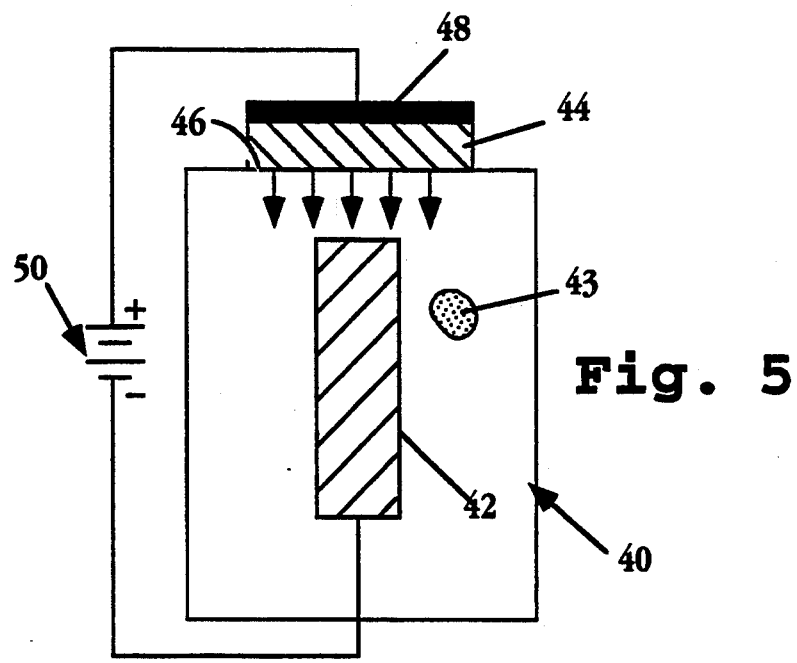
FIG. 5 illustrates an embodiment of the method of the invention in which a reinforcing bar serves as an electrode in a structure having a microporous matrix.

FIG. 5 shows a simplified view of one configuration used in practicing the method of the invention. A cementitious structure 40 shown in the figure has an embedded reinforcing bar 42 which is to be corrosion-protected. The structure is formed of a cementitious material having a microporous matrix, indicated at 43. The electrolyte solution which contains an anti-corrosion agent, as described above, is carried in a reservoir, such as a sponge 44, which is placed in contact with a surface 46 of the structure. The initial concentration of the anti-corrosive agent in the electrolyte solution is preferably between about 1–50 mM for every liter of matrix volume separating the reinforcing member and the surface against which the solution is placed.

It will be appreciated that the reservoir could be any suitable liquid reservoir, such as one formed by extending the walls of the structure above the upper surface 46 of the structure.

The electrolyte solution in the reservoir is also placed in contact with an electrode 48, as shown. Typical electrodes are Pt or Ti screens, or graphite cloths. These can be laid over the sponge-type reservoirs, or placed directly on top of the surface of the solution if a solution container is used. The electrodes should be inert to reactions with the electrolytes present in the solution. The second electrode in this embodiment is provided by the reinforcing bar which is to be corrosion-protected.

The two electrodes are connected to a voltage source 50, with a polarity which acts to draw the corrosion-protecting agent in the reservoir into and through the microporous matrix of the structure. The voltage potential applied across the electrodes is preferably between 5–20 V for each centimeter separating the reinforcing member from the reservoir of electrolyte solution, to provide relatively high ion mobility through the matrix, as discussed above. The selected polarity of the voltage in FIG. 5 is such as to draw a positively charged anti-corrosive agent, such as TEP+, toward the negatively charged reinforcing member.

Figure 6:
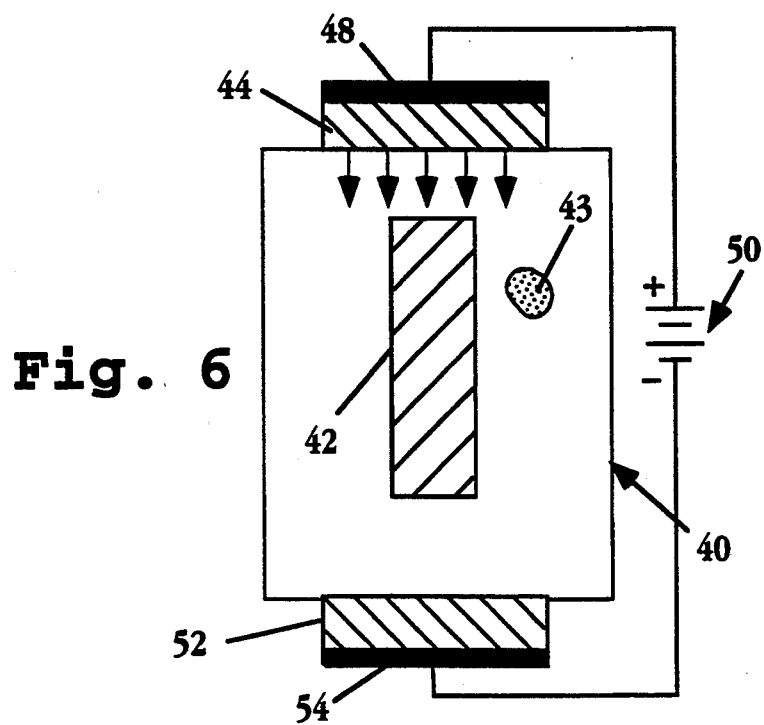
FIG. 6 illustrates a second embodiment of the method in which a second external electrode is used for producing an electrical field in the structure.

Another embodiment of the invention is shown in FIG. 6. The reference numerals in this embodiment refer to the same elements as in FIG. 5, except where indicated otherwise. In this embodiment, a second reservoir, such as a sponge 52, is placed against the face of the structure opposite the face which the solution contacts. The reservoir contains a second electrolyte solution which may be similar to the electrolyte solution contained in reservoir 44, but without the corrosion-inhibiting agent.

The second electrode 54 in this configuration is placed in contact with sponge 52, and the electrodes 48, 54 are connected to a voltage supply 50, as shown. When a voltage is applied, the resulting electric field extends between the electrodes and includes the reinforcing member. As above, the anti-corrosion agent in the upper reservoir migrates from reservoir 44 through the structure and coats the reinforcing member.

The progress of the coating process can be monitored by measuring the corrosion potential of the reinforcing member. The corrosion potential is determined by measuring the voltage across a reference electrode and the reinforcing member, as described in Example 1. When the corrosion potential is above an empirically defined threshold of about −0.35 V, the reinforcing member is considered to be protected from those electrochemical reactions which cause its deterioration by corrosion. This threshold value has been determined from electrochemical studies of reinforcing members contained in structures which have experienced structural failure.

Figure 7:
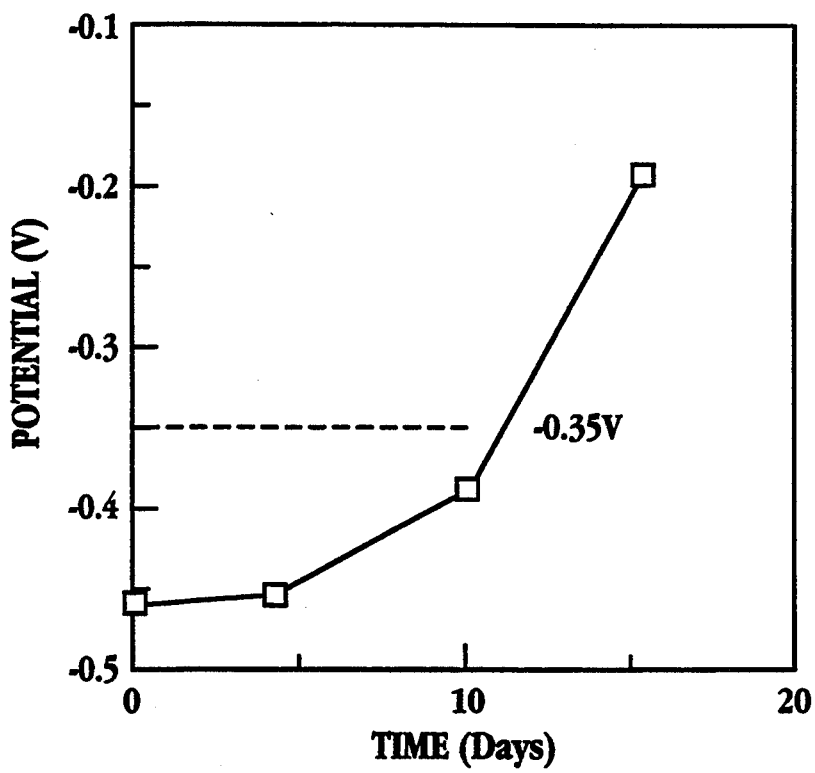
FIG. 7 shows the change in corrosion potential of a reinforcing member as a function of time, resulting from the migration of anti-corrosive agents with an applied voltage of 5 V, and a concentration of 100 mM of $(C_2H_5)_4PNO_2$ in a saturated solution of $Ca(OH)_2$.

FIG. 7 shows the change in corrosion potential of a steel reinforcing member as a function of applied-voltage time. The experimental conditions are described in detail in Example 1. An applied electric field of 5 V/cm was used. After approximately 11 days of applying the anti-corrosion agent, the corrosion potential reached the −0.35 V threshold.

It will be appreciated how the above-described method can be applied to large structures, such as a bridges, to provide corrosion resistance to the network of reinforcing bars in the structure. Many reinforced concrete structures have surface-access points to the reinforcing members, and an electrical wire or cable can be attached to the reinforcing-bar network at such points. If no surface access is available, the reinforcing bars can be accessed through drill holes formed in the structure. If the members of the network are welded together, the entire network will act as a single electrode, and only one connection to the voltage source is necessary. If the network is in disjoint units, then multiple electrical connections may be necessary.

The anti-corrosive agent is applied to one surface of the structure through a sponge-like mat, as described above, which is saturated with an electrolyte solution containing an anti-corrosive agent. The chemical components of anti-corrosive agent and electrolyte solution suitable for large-scale applications are similar to those discussed above and illustrated in the examples. A Ti grid, or an electrically-conductive graphite cloth may be placed over the sponge-like mat to serve as an electrode and is connected to a suitable power supply. A voltage is then applied across the electrode and the reinforcing-member network, causing migration of the anti-corrosive agent into the structure matrix, as described above, until the corrosion potential of the reinforcing network reaches to a pre-determined level.

By way of example, if the method of the invention is being applied to the reinforcing network of a bridge structure, polyurethane mats are laid upon the bridge decking and saturated with the electrolyte solution containing an anti-corrosive agent. A Ti grid connected to the power source is then laid over the saturated mats. With the network of reinforcing members connected to the opposite power-source terminal, a voltage is applied across the region of the matrix extending between the network of reinforcing members and the electrolyte solution. The voltage is applied, and the mats are maintained in a saturated condition, until the corrosion potential of the network reaches a desired corrosion potential, e.g., −0.35 V.

The following examples are included for the purpose of illustrating the invention, and are not intended to limit the scope of the invention in any manner.

EXAMPLE 1

Corrosion Inhibition of Reinforcing Bars in Concrete

The method of the present invention was tested on a concrete column having an embedded steel reinforcing member. The column was formed from a concrete mixture having a cement:sand:aggregate:water weight ratio of 1:2.14:2.72:0.5. Additionally, NaCl was added in a weight ratio of 1:0.04 (cement:NaCl). This amount of NaCl is equivalent to a concentration of Cl− ions of 15 lb/yd$^3$.

The mixture was packed into a hollow plastic cylinder having a 4 cm diameter and an 20.5 cm height, such that the top of the concrete column was 2 inches below the top rim of the cylinder. The reinforcing member in the structure had a 1.1–1.2 cm diameter, a length of 15.4 cm, and was placed in an orientation parallel to the axis of the concrete column, about 2 inches from the top of the concrete (see FIG. 5). The concrete was allowed to cure for about 28 days to ensure complete solidification of the concrete matrix.

A wire was attached to the reinforcing member and this wire was connected to the cathode terminal of a 100 V DC power supply (Kepco). 25 mL of a saturated $Ca(OH)_2$ solution containing a 100 mM concentration of $TEPNO_2$ was placed in the cylindrical volume formed at the top of the concrete column and below the upper side regions of the glass cylinder. A Pt electrode was placed into contact with the solution and the electrode was connected to the anode terminal of the power supply.

The power supply was set to produce a voltage of 40 V between the electrodes. Under this voltage, the $TEP^+$ ions contained in the upper solution migrated downwardly through the concrete column along with other cations contained in the solution. The corrosion potential of the reinforcing member was measured with a high-impedance voltmeter (a Keithley 617 electrometer). As the $TEP^+$ migrated from the top of the column towards the reinforcing member, the potential of the reinforcing member was observed to change from $-0.45$ V to $-0.20$ V over a period of 15 days (see FIG. 7).

EXAMPLE 2

Figure 8:
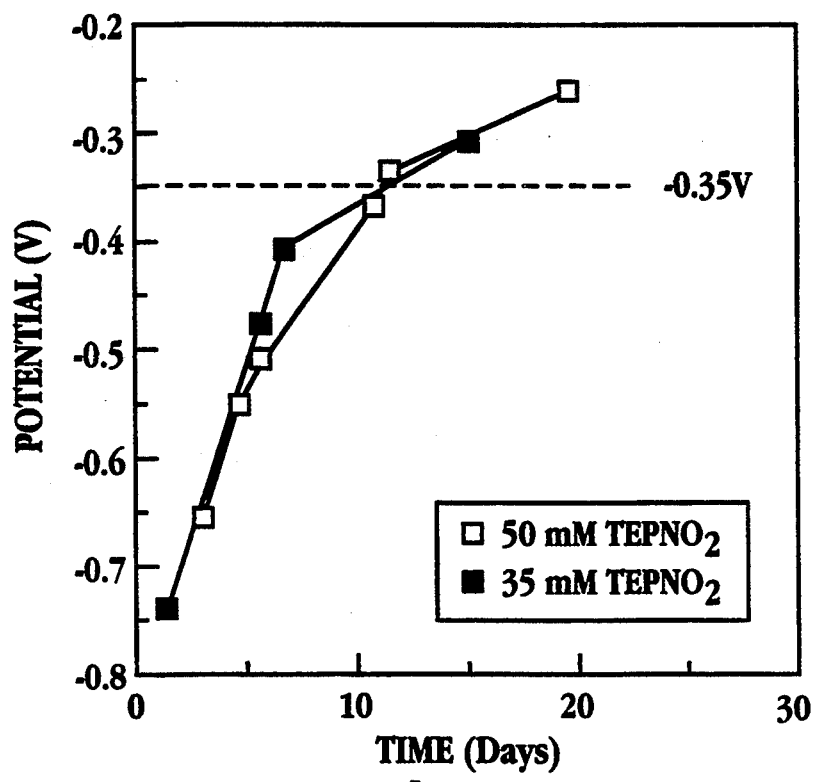
FIG. 8 shows the change in corrosion potential of a reinforcing member, as a function of time, resulting from the injection of anti-corrosive agents with an applied voltage of 5 V, for a solution containing either 50 mM (open squares) or 35 mM (closed squares) of $(C_2H_5)_4PNO_2$ in a saturated solution of $Ca(OH)_2$ also including sodium glycinate and hydrazine hydrate.

Corrosion Inhibition at Various Inhibitor Concentrations With Glycinate and Hydrated Hydrazine Added to the Inhibitor The method described in Example 1 was carried out with the concentration of $TEPNO_2$ in the upper electrolyte solution lowered to 35 mM or 50 mM. In addition, 20 mg of glycinate and 15 mg of hydrazine hydrate were added to the saturated upper electrolyte solution. A voltage of 56 V was applied in the method employing the 35 mM $TEPNO_2$ concentration, and an applied voltage of 60 V was used in the method employing the 50 mM $TEPNO_2$ concentration. The change of corrosion potential, as a function of time, for each set of experimental conditions is shown in FIG. 8. As can be seen, both of the $TEPNO_2$ concentrations employed were able to raise the corrosion potential of the reinforcing member above the $-0.35$ V threshold after 10–20 days of continual voltage application.

Although the invention has been described with respect to particular materials and methods, it will be apparent to one skilled in the art that various changes and modifications may be made without departing from the invention.

It is claimed:

1. A method of applying an anti-corrosive coating agent to a corrodible reinforcing member embedded within a cementitious microporous matrix in a structure having an exposed matrix surface, wherein said coating agent is known to retard the corrosion of metals and is either a positively charged species or a neutral species combined with a positively charged surfactant, which method comprises the steps of:
   (a) contacting an electrolyte solution containing said agent with said exposed matrix surface of the structure;
   (b) placing a first electrode in contact with the electrolyte solution;
   (c) providing a second electrode which is located at a position spaced from the first electrode, such that application of a voltage across the first and second electrodes is effective to produce an electric field in a region of the structure which includes the reinforcing member and cementitious matrix between said exposed matrix surface with which the electrolyte solution is in contact and the reinforcing member;
   (d) applying across the two electrodes, a selected-polarity voltage effective to cause migration of the anti-corrosive agent in the electrolyte solution through the cementitious matrix in said structure region; and
   (e) by said migration, causing the anti-corrosive agent to contact and coat the reinforcing member to protect it from corrosion.

2. The method of claim 1, wherein the anti-corrosive agent is a cationic species selected from the group consisting of $(C_2H_5)_4P^+$ and $(C_4H_9)_4P^+$.

3. The method of claim 1, wherein the electrolyte solution is a saturated $Ca(OH)_2$ solution.

4. The method of claim 3, wherein the saturated $Ca(OH)_2$ electrolyte solution also contains sodium glycinate and hydrazine hydrate.

5. The method of claim 1, wherein the concentration of anti-corrosive agent in the electrolytic solution is between about 1–50 mM for every liter of matrix volume.

6. The method of claim 1, wherein the voltage which is applied is between 5–20 volts for each centimeter separating the reinforcing member from said matrix surface upon which the electrolytic solution is applied.

7. The method of claim 1, wherein the electrolyte solution contacts the matrix surface through a sponge.

8. The method of claim 1, wherein the electric potential is applied until the corrosion potential of the reinforcing member, as measured with respect to a silver/silver chloride half cell containing 0.1M KCl, reaches a value greater than about $-0.35$ V.

9. A method according to claim 1 wherein the second electrode includes the reinforcing member.

10. A method according to claim 1 wherein the coating agent is a cationic species.

11. A method according to claim 1 wherein the coating agent is a neutral species combined with a positively charged surfactant.

12. A method of applying an anti-corrosive coating agent to a corrodible reinforcing member embedded within a cementitious microporous matrix in a structure having an exposed matrix surface, wherein said coating agent is known to retard the corrosion of metals and is either a positively charged species or a neutral species combined with a positively charged surfactant, which method comprises the steps of:
   (a) contacting an electrolyte solution containing said agent with said exposed matrix surface of the structure;
   (b) placing one electrode in contact with the electrolyte solution;
   (c) providing a second electrode which is placed at a position spaced from the first electrode, such that application of a voltage across the first and second electrodes is effective to produce an electric field in a region of the structure which includes the reinforcing member and cementitious matrix between said exposed matrix surface with which the electrolyte solution is in contact and the reinforcing member;

(d) applying across the two electrodes, a selected-polarity voltage effective to cause migration of the anti-corrosive agent in the electrolyte solution through the cementitious matrix in said structure region;

(e) by said migration, causing the anti-corrosive agent to contact and coat the reinforcing member to protect it from corrosion; and (f) continuing steps (a) through (e) until the reinforcing member has a corrosion potential, as measured with respect to a silver/silver chloride half cell containing 0.1M KCl, of greater than −0.35 V.

13. The method of claim 12, wherein the anti-corrosive agent is a cationic species selected from the group consisting of $(C_2H_5)_4P^+$ and $(C_4H_9)_4P^+$.

14. The method of claim 12, wherein the concentration of anti-corrosive agent in the electrolyte solution is between about 1–50 mM for every liter of matrix volume.

15. The method of claim 12, wherein the voltage which is applied is between 5–20 volts for each centimeter separating the reinforcing member from said matrix surface upon which the electrolytic solution is applied.

16. A method according to claim 12 wherein the second electrode includes the reinforcing member.

17. A method according to claim 12 wherein the coating agent is a cationic species.

18. A method according to claim 12 wherein the coating agent is a neutral species combined with a positively charged surfactant.

* * * * *